Patented Sept. 22, 1936

2,055,332

UNITED STATES PATENT OFFICE 2,055,332

PROCESS FOR THE PURIFICATION OF SODIUM METAPHOSPHATE

Charles S. Bryan, Providence, R. I., assignor to Rumford Chemical Works, Rumford, R. I.

No Drawing. Application December 7, 1934, Serial No. 756,460

6 Claims. (Cl. 23—107)

My invention relates particularly to the purification of metaphosphates and especially metaphosphates of the alkali metals, such, for instance, as monometaphosphate of sodium or potassium, or any of their polymers, and product thereof.

In the usual process of the manufacture of metaphosphates, as, for example, any metaphosphate phosphatic material, as, for instance, phosphate rock, phosphorite, apatite or bone material, is treated with sulphuric acid so as to form a solution of orthophosphoric acid, to which is then added sodium carbonate or sodium hydroxide, or any other alkali metal carbonate or hydroxide, forming an orthophosphoric acid salt, that is $NaH_2PO_4$. This results in the precipitation of some of the impurities present, which are ordinarily iron, aluminum, chromium, vanadium, etc., as iron and aluminum hydrates or iron carbonates. However, sufficient sodium carbonate or sodium hydroxide is not added to precipitate all of the iron and aluminum as then disodium hydrogen orthophosphate, $Na_2HPO_4$, or trisodium orthophosphate, $Na_3PO_4$, would be formed and remain in solution so as to interfere with obtaining all of the sodium salt as metaphosphate in the subsequent fusion.

The precipitated aluminum compounds, as well as the calcium sulphate, are then filtered off and the resulting solution, containing the sodium dihydrogen orthophosphate, is evaporated to dryness and fused at approximately red heat. On cooling, the mixture, metaphosphate, $NaPO_3$, or some polymeric form thereof, is obtained. The resulting sodium metaphosphate, therefore, contains a considerable quantity of impurities in the form of metaphosphates of iron, aluminum, chromium, vanadium, etc., which have a deleterious effect in the various technical uses of the product, as, for instance, when used for the softening of feed water in steam boilers and as a detergent or water softener in laundry work, for washing or cleansing, in bleaching, in preventing soap spots on cloth, for scouring wool, for kier boiling cotton, for increasing the penetration of dyes, for cleansing structural materials and for cleaning ceramics. These impurities, and particularly the iron compounds, further cause a discoloration of the finished product. It is the object of my invention to remove such impurities.

While my invention is capable of being carried out in many different ways, for the purpose of illustration I shall describe only certain forms of procedure which may be followed in connection therewith.

The impure sodium metaphosphate containing impurities such as those mentioned above, is dissolved in the proportion of 1 part by weight of metaphosphate to 4 parts by weight of water. To this water solution I then add from .05 to .15 part, but preferably 10%, by weight of sodium hydroxide as compared with the metaphosphate, instead of which there may be added any other alkali metal hydroxide or carbonate, to precipitate the iron, aluminum, chromium and vanadium as the corresponding compounds, but not sufficient sodium hydroxide, or alternative compound, as mentioned above, is added to re-dissolve the precipitated aluminum hydroxide as the latter is soluble in an excess of sodium hydroxide. I now filter off the precipitated compounds of iron, aluminum, etc., which are discarded and the filtrate is then evaporated to dryness, thus obtaining a purified sodium metaphosphate containing a slight excess of sodium hydroxide, according to the alkali metal compound added, as I have found this to be advantageous in carrying out the procedure. There is thus obtained, on cooling, the metaphosphate which has a slight alkaline reaction, although the slight excess of the sodium hydroxide just referred to has been decreased somewhat as a result of the fusion, as the said excess is almost completely neutralized thereby. There will, of course, also be more of the sodium metaphosphate obtained as a result of this treatment, owing to the fact that the iron and aluminum are present therein as metaphosphates and from the latter some sodium metaphosphate will be formed by reaction with the sodium hydroxide or other compound added.

In carrying out my invention, also, if desired, the evaporation to dryness of the original solution containing the sodium dihydrogen orthophosphate may be dispensed with and, instead, the solution may be concentrated to any desired strength, as, for example, 56° Bé., whereupon the same is mixed with the usual amount of the sodium carbonate or sodium hydroxide or other alkali metal carbonate or hydroxide. A vigorous reaction results with the formation of substantially dry powdered sodium orthophosphate, which may be converted directly into sodium metaphosphate by heating and fusion. This, of course, contains all of the impurities originally present in the orthophosphoric acid, but these impurities are practically completely removed in the subsequent precipitation with sodium hydroxide or the alternative alkali metal compound as given above.

The product thus obtained, and which is the sodium metaphosphate, has a slight alkalinity, but this does not interfere with the many industrial uses to which the metaphosphate is applied, as above referred to, but, in fact, is an advantage, not only because the alkalinity adds to the cleansing properties and is more satisfactory and economical for softening water, but as, furthermore, the dry compound is more readily soluble in water by reason of the free alkali present.

While I have described my invention above in detail I wish it to be understood that many changes may be made therein without departing from the spirit of the same.

Also, wherever sodium metaphosphate is referred to herein I mean to include thereby monosodium metaphosphate or any polymer thereof.

I claim:

1. The process of purifying an alkali metal metaphosphate containing iron metaphosphate as an impurity which comprises adding .05 to .15 part by weight of an alkali metal hydroxide or carbonate on the basis of one part by weight of the alkali metal metaphosphate, to a solution thereof to substantially eliminate all of the said impurity therefrom by precipitation and then filtering off the precipitate.

2. The process of purifying sodium metaphosphate containing iron metaphosphate as an impurity which comprises adding .05 to .15 part by weight of an alkali metal hydroxide or carbonate on the basis of one part by weight of the sodium metaphosphate, to a solution thereof to substantially eliminate all of the said impurity by precipitation and then filtering off the precipitate.

3. The process which comprises treating a phosphatic material with sulphuric acid, filtering to obtain a solution of orthophosphoric acid, concentrating the same, adding an amount of an alkali metal hydroxide or carbonate sufficient to form an insoluble compound with an impurity therein but insufficient to cause the presence of an orthophosphate on fusion, thus obtaining an impure alkali metal orthophosphate, fusing to produce the alkali metal metaphosphate and purifying the alkali metal metaphosphate containing iron and aluminum metaphosphates as an impurity by adding .05 to .15 part by weight of an alkali metal hydroxide or carbonate on the basis of one part by weight of the alkali metal metaphosphate, to a solution thereof to substantially eliminate all of the said impurity therefrom by precipitation and then filtering off the precipitate.

4. The process which comprises treating a phosphatic material with sulphuric acid, filtering to obtain a solution of orthophosphoric acid, concentrating the same, adding an amount of a sodium hydroxide or carbonate sufficient to form an insoluble compound with an impurity therein but insufficient to cause the presence of an orthophosphate on fusion, thus obtaining an impure sodium orthophosphate, fusing to produce the sodium metaphosphate and purifying the sodium metaphosphate containing iron and aluminum metaphosphates as an impurity by adding .05 to .15 part by weight of a sodium hydroxide or carbonate on the basis of one part by weight of the sodium metaphosphate, to a solution thereof to substantially eliminate all of the said impurity therefrom by precipitation and then filtering off the precipitate.

5. The process which comprises treating a phosphatic material with sulphuric acid, filtering to obtain a solution of orthophosphoric acid, concentrating the same, adding an amount of an alkali metal hydroxide or carbonate sufficient to form an insoluble compound with an impurity therein but insufficient to cause the presence of an orthophosphate on fusion, thus obtaining an impure alkali metal orthophosphate, fusing to produce the alkali metal metaphosphate and purifying the alkali metal metaphosphate containing iron and aluminum metaphosphates as an impurity by adding .05 to .15 part by weight of an alkali metal hydroxide or carbonate on the basis of one part by weight of the alkali metal metaphosphate, to a solution thereof to substantially eliminate all of the said impurity therefrom by precipitation and then filtering off the precipitate.

6. The process of purifying an alkali metal metaphosphate containing iron, aluminum, chromium and vanadium metaphosphates as an impurity which comprises adding .05 to .15 part by weight of an alkali metal hydroxide or carbonate on the basis of one part by weight of the alkali metal metaphosphate, to a solution thereof to precipitate substantially all of the said impurity, the same being added in a slight excess over the amount required to eliminate the impurity, and then filtering off the precipitate.

CHARLES S. BRYAN.